Figure 3:
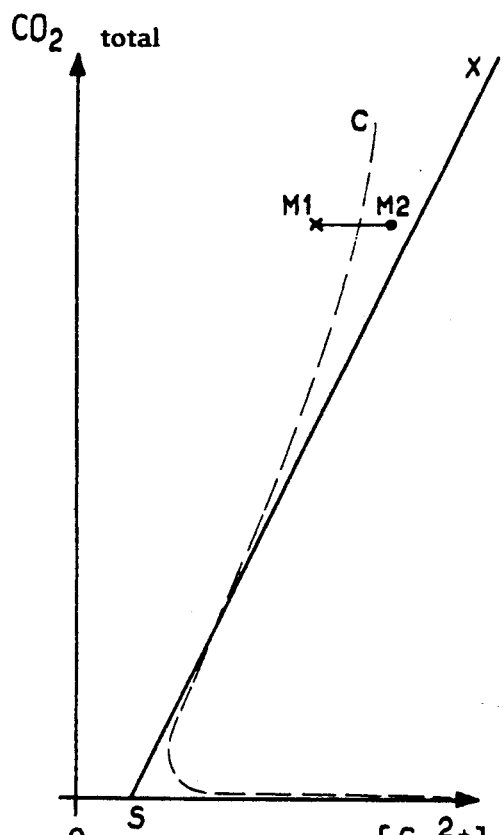

United States Patent [19]

Legrand et al.

[11] Patent Number: 5,051,281
[45] Date of Patent: Sep. 24, 1991

[54] PROCESS AND PLANT FOR PROTECTING WATER PIPEWORKS FROM CORROSION

[76] Inventors: Luc Legrand, 6 Résidence Péguy, Bourg La Reine, 92340; Pierre Leroy, 1 Rue des Platanes, Choisy Le Roi, 94600 both of France

[21] Appl. No.: 328,194
[22] PCT Filed: Jun. 9, 1988
[86] PCT No.: PCT/FR88/00294
§ 371 Date: Feb. 6, 1989
§ 102(e) Date: Feb. 6, 1989
[87] PCT Pub. No.: WO88/09832
PCT Pub. Date: Dec. 15, 1988

[30] Foreign Application Priority Data

Jun. 12, 1987 [FR] France ............... 87 08198

[51] Int. Cl.⁵ .................. B05D 7/22; B05C 11/00
[52] U.S. Cl. ................. 427/230; 118/408; 118/410; 118/602; 427/235; 427/239; 427/345; 427/430.1; 427/435
[58] Field of Search ........... 118/602, 408, 410; 427/235, 239, 345, 319, 435, 430.1, 230

[56] References Cited

U.S. PATENT DOCUMENTS

| | | | |
|---|---|---|---|
| 1,683,521 | 9/1928 | Bourgognion et al. | 422/14 |
| 3,640,759 | 2/1972 | Primus et al. | 427/239 |
| 4,264,651 | 4/1981 | Hasson et al. | 427/239 |
| 4,678,685 | 7/1987 | Hasson et al. | 427/239 |

FOREIGN PATENT DOCUMENTS 0178729 4/1986 European Pat. Off. .
2446260 8/1980 France .

OTHER PUBLICATIONS

"Corrosion Prevention by Controlled Calcium Carbonate Scale", *Industrial and Engineering Chemistry*, vol. 37, No. 9, Sep. 1945, by S. Powell et al., pp. 842-846.

*Primary Examiner*—Janyce Bell
*Attorney, Agent, or Firm*—Young & Thompson

[57] ABSTRACT

Plant for treating water from a first pipe to protect the internal walls of a pipework, including a storage tank (R) for powdered lime, a loop (2) for bleeding water from the first pipe (1), a lime saturator (S) located on the loop (2), and structure (3, 4, 5) for adding powdered lime from the storage tank (R) into the saturator (S). The loop (2) includes, upstream of the saturator (S), relative to the direction of water flow, a decarbonator (D) fed with water which is to be treated. A second pipe (6, 2) which connects the outlet of the saturator (S) with the first pipe (1) includes a loop (7) for recycling a part of the material from the saturator (S) to the decarbonator (D). The structure for adding powdered lime includes a pipe (5) which receives the powdered lime and which connects the outlet of the decarbonator (D) with the inlet of the saturator (S).

6 Claims, 9 Drawing Sheets

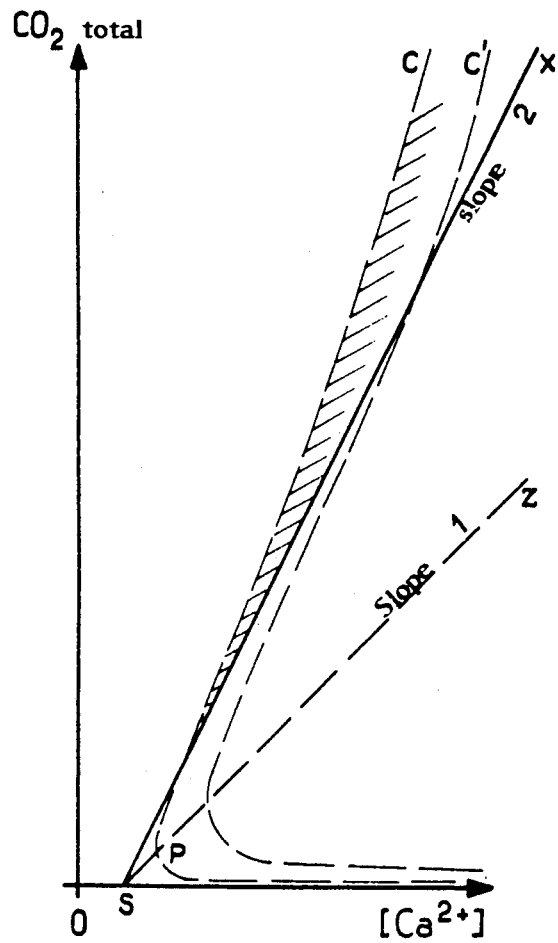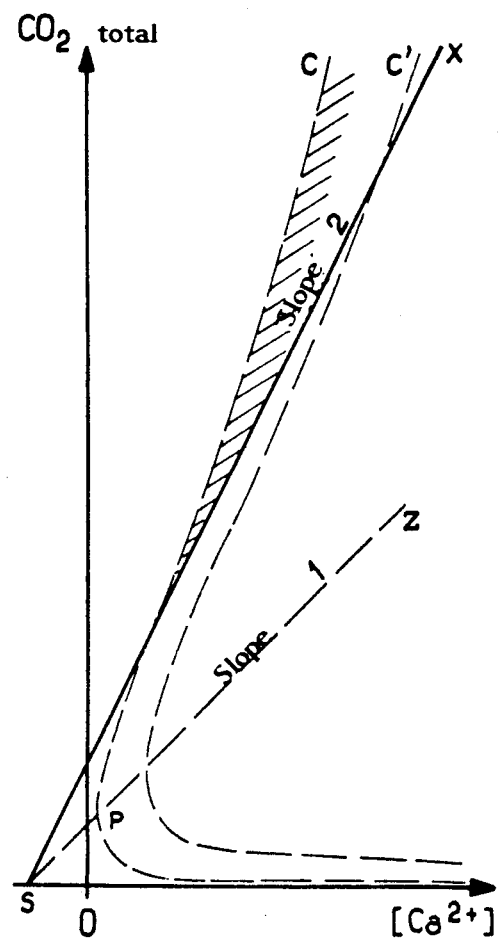
FIG_1        FIG_2

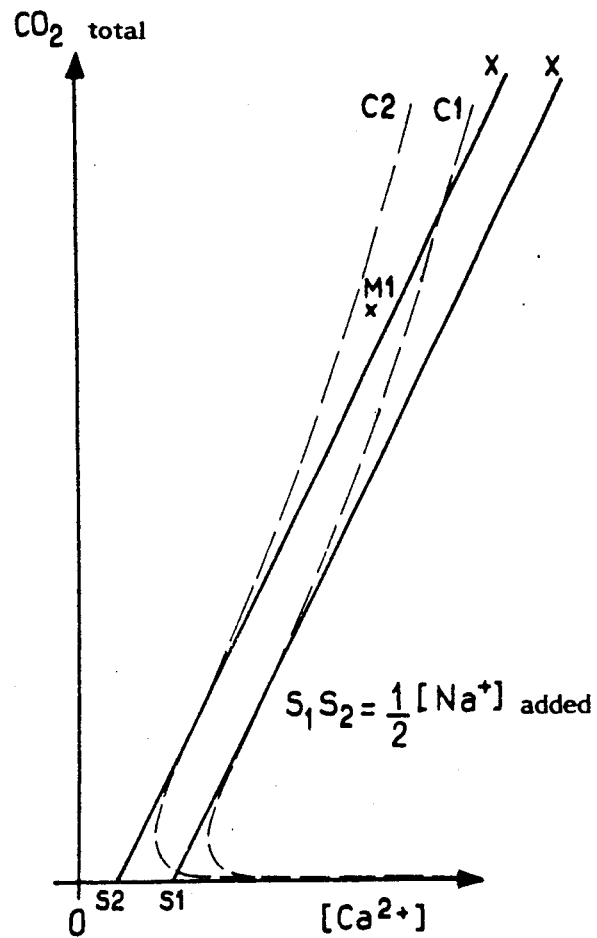
FIG_7
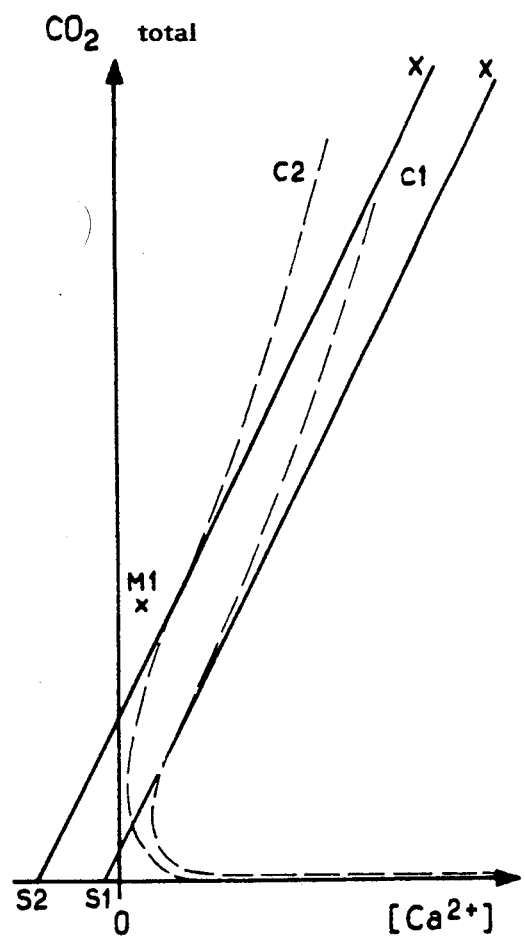
FIG_8

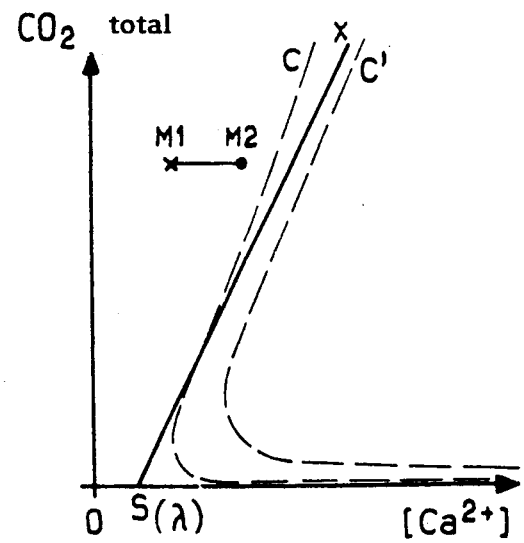
FIG_9
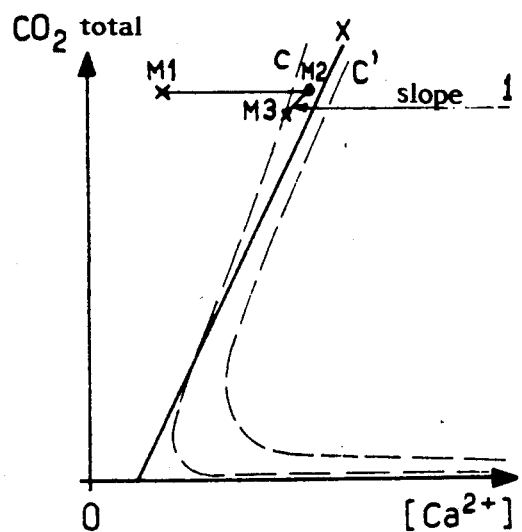
FIG_10
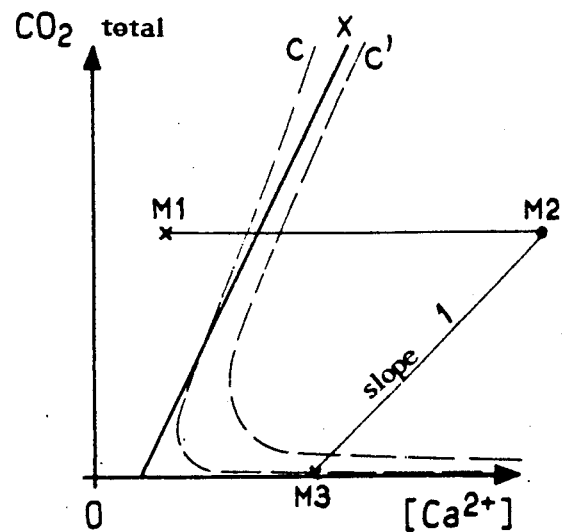
FIG_11

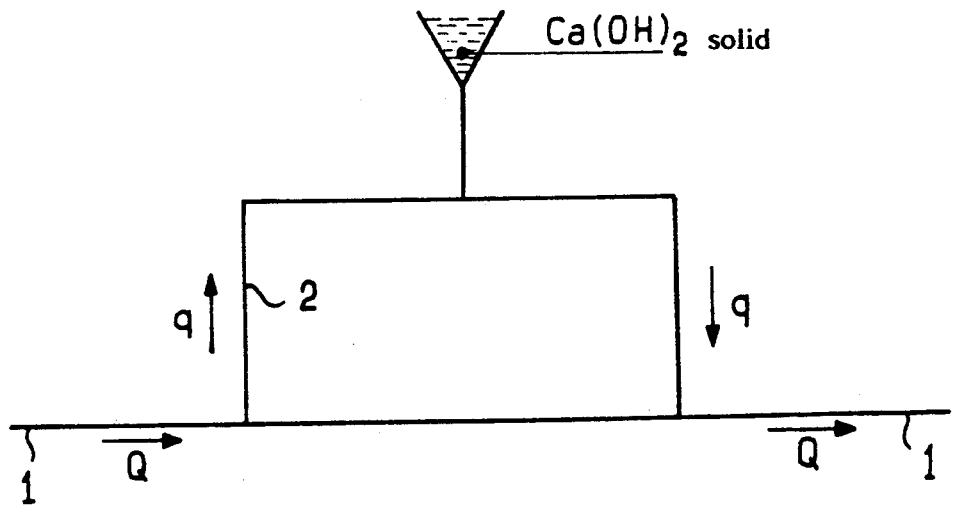
FIG_12
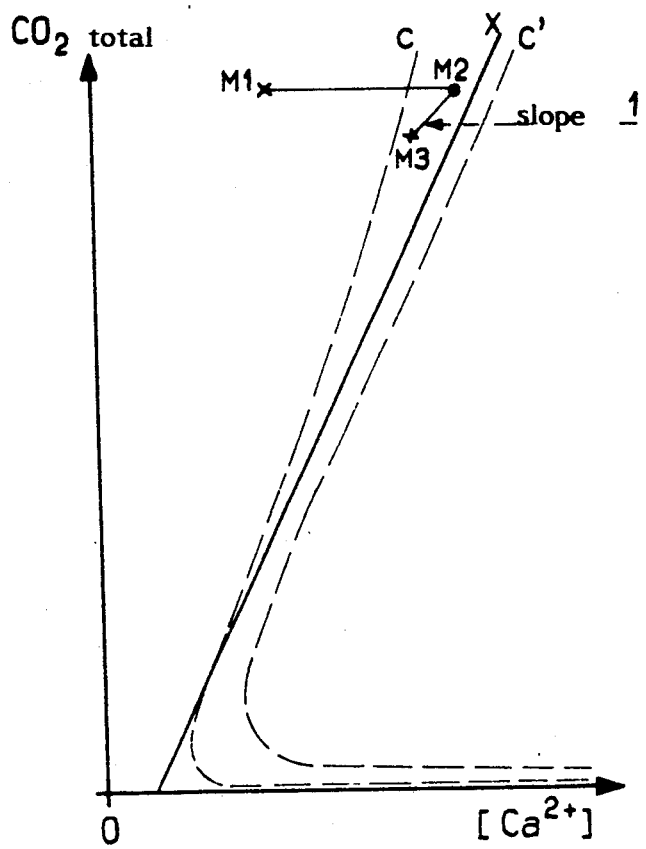
FIG_13

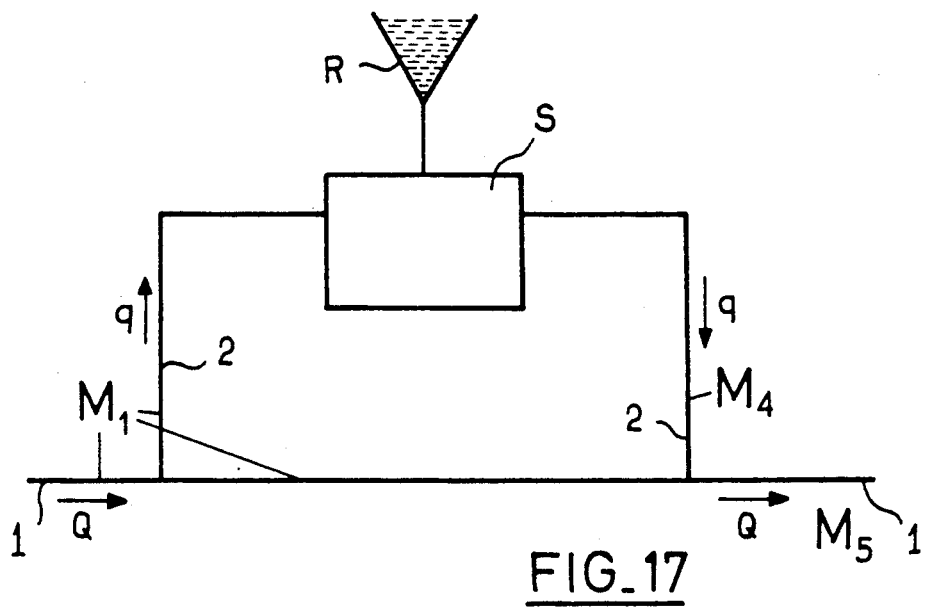
FIG_17
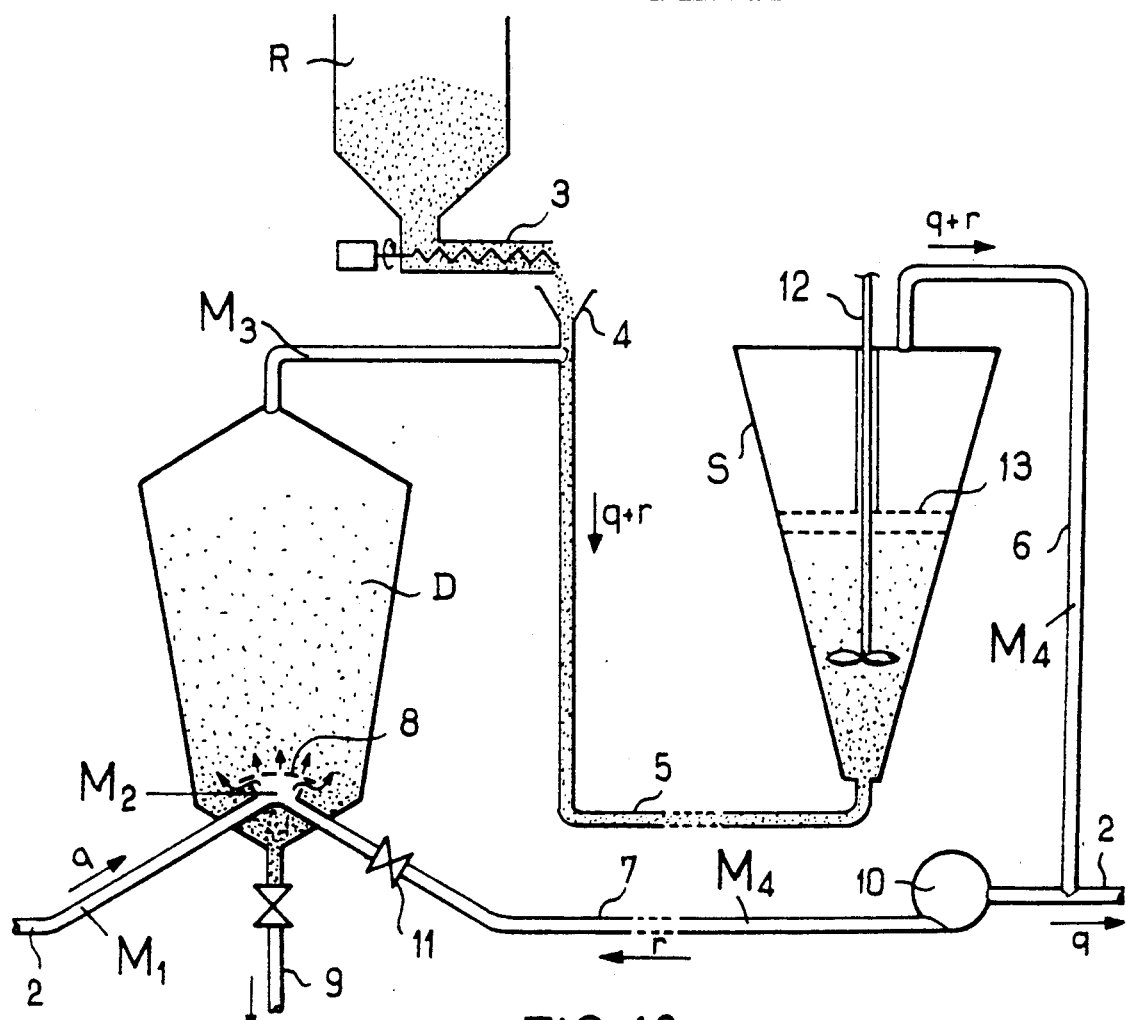
FIG_18

PROCESS AND PLANT FOR PROTECTING WATER PIPEWORKS FROM CORROSION

The present invention relates to a process and a plant which enable the corrosion of the inside walls, made of ferrous metals or based on cement, of pipeworks for transporting water to be avoided.

Water transported in pipe networks may be in contact with ferrous metals (cast iron, steel, galvanized steel) or materials based on cement (coatings of cement mortar on metallic pipeworks, reinforced concrete, asbestos cement). In order to simultaneously avoid the corrosion of ferrous metals and that of materials based on cement, it is essential that this water should be capable of giving rise to a protective precipitate of calcium carbonate ($CaCO_3$). In other words, it must be encrusting.

On the graph of total $CO_2$—$Ca^{2+}$ (cf. Les equilibres carboniques et l'equilibre calcocarbonique dans les eaux naturelles, Eyrolles 1981, by the present applicants), the graphical point for the composition of a water of this kind must correspond to the conditions below (see FIGS. 1 and 2):

It must be located to the right of the calcium/carbonate equilibrium curve (curve C). Indeed, waters plotted to the left of this curve are aggressive with respect to solid $CaCO_3$.

It must be located to the left of the curve of spontaneous precipitation of $CaCO_3$ (curve C'). Indeed, waters plotted to the right of this curve, which are unstable, are observed to form and develop within their bulk nuclei of $CaCO_3$ not being able to give rise to an adhering precipitate on the walls of the pipeworks.

It must be slightly to the right of the curve C. If it is not so, the thickness of the $CaCO_3$ precipitate formed on the walls of the pipeworks could be too great.

It must be located above the semi-straight line SX, of slope 2. If not, on the one hand the formation of the precipitate of solid $CaCO_3$ could be at risk, and on the other hand the sterilization of the transported water by chlorine would not be guaranteed, the pH of the water being too high. The abscissa of the point S of the semi-straight line SX depends on the concentration of the ions.

$$SO_4{}^{2-}, Cl^-, NO_3{}^-, Mg^{2+}, Na^+ \text{ and } K^+.$$

It is known that waters which are available are often aggressive towards solid $CaCO_3$. It is possible to make them encrusting by adding lime ($Ca(OH)_2$), which has to be preceded by, if appropriate, by an addition of carbon dioxide ($CO_2$).

As a result of the addition of $Ca(OH)_2$, the point on the graph for the water moves from $M_1$ located to the left of the curve C to $M_2$ located slightly to the right of the curve C (see FIGS. 3, 4, 5 and 6). At a preliminary stage, it moves from $M_0$ to $M_1$ as a result of the addition of $CO_2$, which is necessary when addition of $Ca(OH)_2$ alone does not enable the treated water to take up a plotted position above the semi-straight line SX, of slope 2 (see FIGS. 5 and 6).

Lime is supplied by the chemical industry in powder form. The use of lime in this solid form is only possible under the two following conditions:

The water must undergo a clarifying treatment before being put into the network, this treatment comprising, in succession, flocculation, possibly decantation, finally filtration. The lime is then added to the water before flocculation;

The coagulant used must not be an aluminium salt. Indeed, making the water slightly enriched in calcium by adding lime results in an increase in the pH. If the coagulant used were an aluminium salt, there would be the risk that the water coming out of the treatment station would have a concentration of $Al^{3+}$ ions greater than the maximum concentration set by health standards.

If these conditions are not met, the lime must be added to the water in the form of a solution, called lime water, which is produced in a lime saturator. However, for reasons which will be explained later on, the use of a lime saturator of the current type has two disadvantages:

the large volume of the device;

and particularly the impossibility of giving rise to a solution with a well defined lime content; now, adding $Ca(OH)_2$ to an aggressive water only guarantees the formation of a protective precipitate of solid $CaCO_3$ on the internal walls of the pipeworks of a network if the concentration of $Ca^{2+}$ ions in the transported water is very precisely that which results from calculation and which is shown on the graph by the abscissa of the point $M_2$ in the FIGS. 3, 4, 5 and 6.

As a consequence of the above, water distribution utilities generally prefer to use reactants other than lime to make water which they have available which is aggressive with respect to solid $CaCO_3$ encrusting. For example, they use sodium hydroxide which is commercially available in solution form and which is thus more convenient to use than lime.

Let us suppose that $M_1$ is the point on the graph for aggressive water which is to be treated (see FIG. 7). This point is not changed by adding sodium hydroxide, while the calcium/carbonate equilibrium curve is moved to the left and simultaneously altered in shape to a greater or lesser extent. The treated water is thus capable of being encrusting, which is the case shown in FIG. 7. However, two observations must be made:

sodium hydroxide costs more than lime for equal effect: for example if the segment $M_1M_2$ of the FIGS. 3, 4, 5 and 6 represents 0.25 millimole per liter the quantity of sodium hydroxide which has to be used per m³ of treated water, which is 20 g of NaOH, costs about 2.5 centimes in France, while the amount of lime which has to be used per m³ of treated water, which is 18.5 g of $Ca(OH)_2$ only costs about 1 centime;

if the available water has a low concentration of $Ca^{2+}$ ions not exceeding about 0.6 millimole per liter, adding sodium hydroxide, whether or not preceded by an addition of carbon dioxide, does not enable a water enriched in calcium, plotted above the semi straight line SX to be obtained, except by using excessive quantities of reactants (see FIG. 8).

The water distribution utilities are now occasionally inclined to use corrosion inhibitors, for example polyphosphates which lead to the formation of a ferric polyphosphate film on the internal walls of pipeworks made from ferrous metal. These reagents, which are commercially available in solution form, are indeed simple to use and the quantities are determined experimentally without the need for great precision. However, the disadvantages are the following:

· they are much more expensive than lime, from 10 to 15 times more expensive per m³ of treated water;

and in particular, the process is not wholly effective. Indeed, in contrast with a precipitate of solid $CaCO_3$, a ferric polyphosphate film is not capable of stopping corrosion in a wall made of ferrous metal, but only of slowing it down. Moreover, the use of a polyphosphate does not put a stop to the degradation of a material based on cement.

The object of the present invention is to eliminate the disadvantages of the known processes by providing a process which guarantees effective protection of pipeworks for transporting waters and whose use is much less expensive than that of known processes.

The invention proposes a process for protecting the internal walls of water pipeworks made from ferrous metals or based on cement, from corrosion, in which water from the pipework is continuously bled, the water being fed into a saturator upstream of which solid lime is added, after which the water is fed back into the pipework, the quantity of lime added to the water from the pipework being such that the point on the graph for the water after treatment, in a diagram in which the concentration of total $CO_2$ is the ordinate and the concentration of $Ca^{2+}$ is the abscissa, is located in a zone encompassed between the calcium/carbonate equilibrium curve and the curve of spontaneous precipitation of $CaCO_3$ and above the semi straight line SX of slope equal to 2, S being located above the axis of the abscissae and its abscissa being dependent on the concentration of the ions $SO_4^{2-}$, $CL^-$, $NO_3^-$, $Mg^{2+}$, $Na^+$ and $K^+$.

According to the invention, this process is characterized in that before being added to the saturator, the bled water is mixed in a decarbonator with a solution which is lean in total $CO_2$ and loaded with lime originating from the saturator, the output of the solution going from the saturator to the decarbonator being high enough to allow the virtually complete elimination of total $CO_2$ in the decarbonator by precipitation of $CaCO_3$.

The principal advantages of this process are the following:

it enables the solid $Ca(OH)_2$ to be completely dissolved, the treated water permanently has an adequate composition, the plant for using the process has a smaller volume.

The plant for using the process according to the invention comprises a storage tank for powdered lime, a loop for bleeding water from a pipework, a lime saturator located on the loop, means of adding powdered lime to the saturator.

According to the invention, this plant is characterized in that the loop is provided with a decarbonator upstream of the saturator, relative to the direction of water flow, fed with water which is to be treated, in that the pipe which connects the outlet of the saturator to the pipework comprises a loop for recycling a part of the solution coming out of the saturator to the decarbonator, and in that the powdered lime is added into the pipe which connects the outlet of the decarbonator to the inlet of the saturator.

Other features and advantages of the invention will be apparent in the description below.

Figure 4:
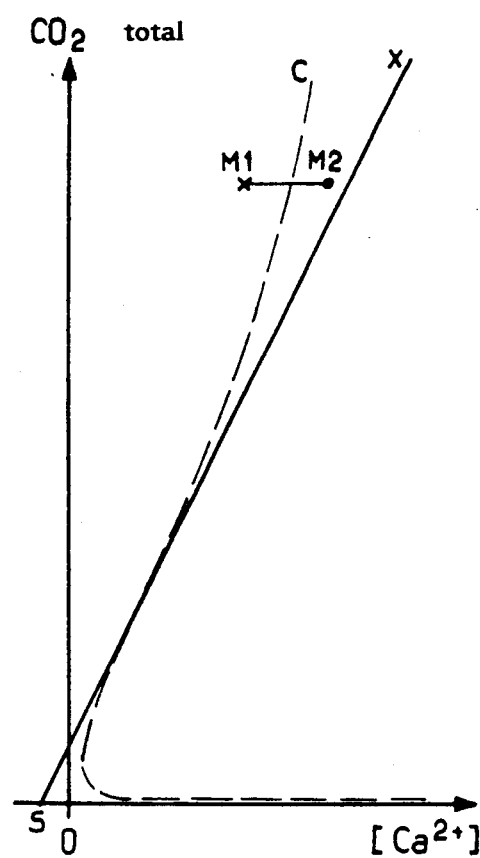
Figure 5:
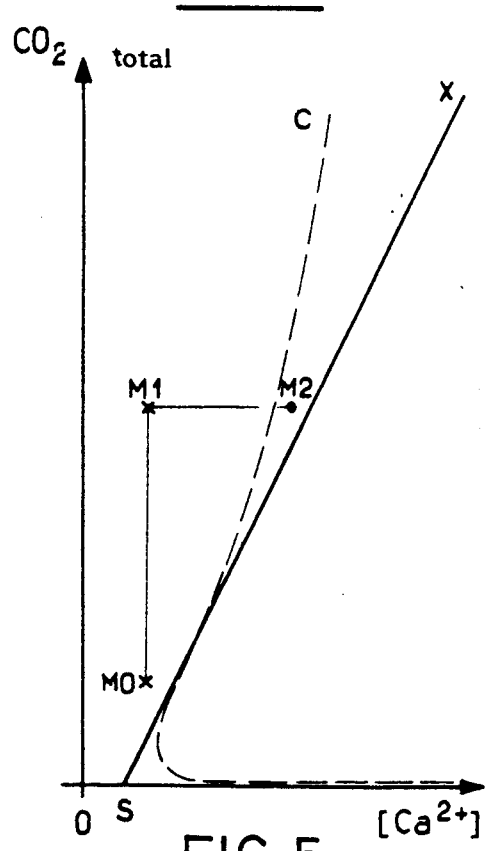
Figure 6:
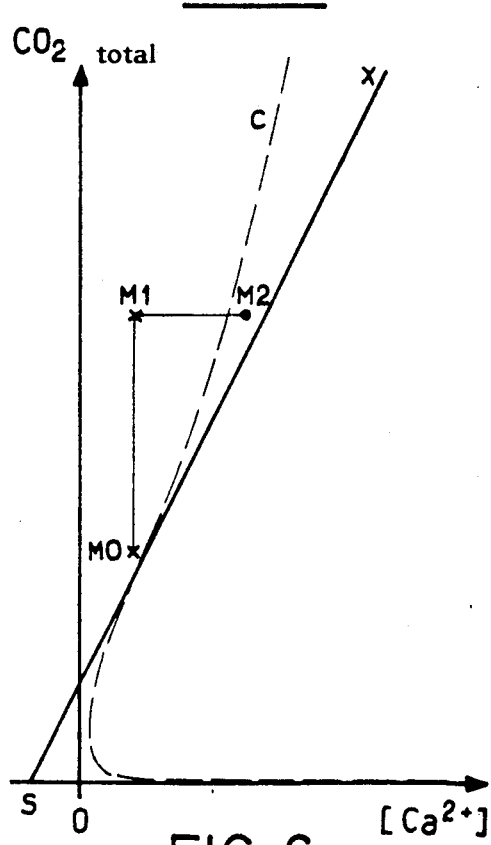
Figure 14:
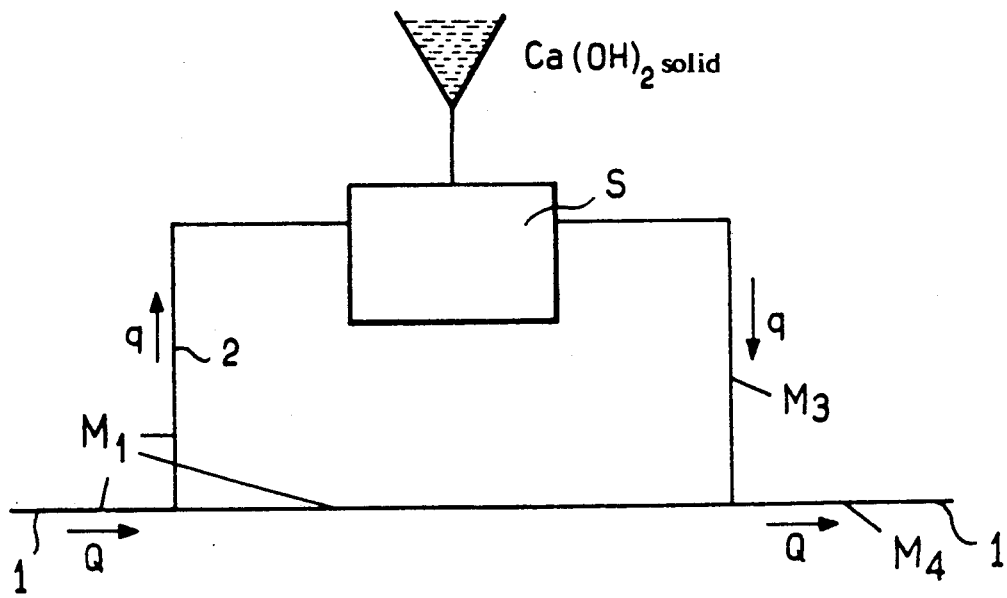
Figure 15:
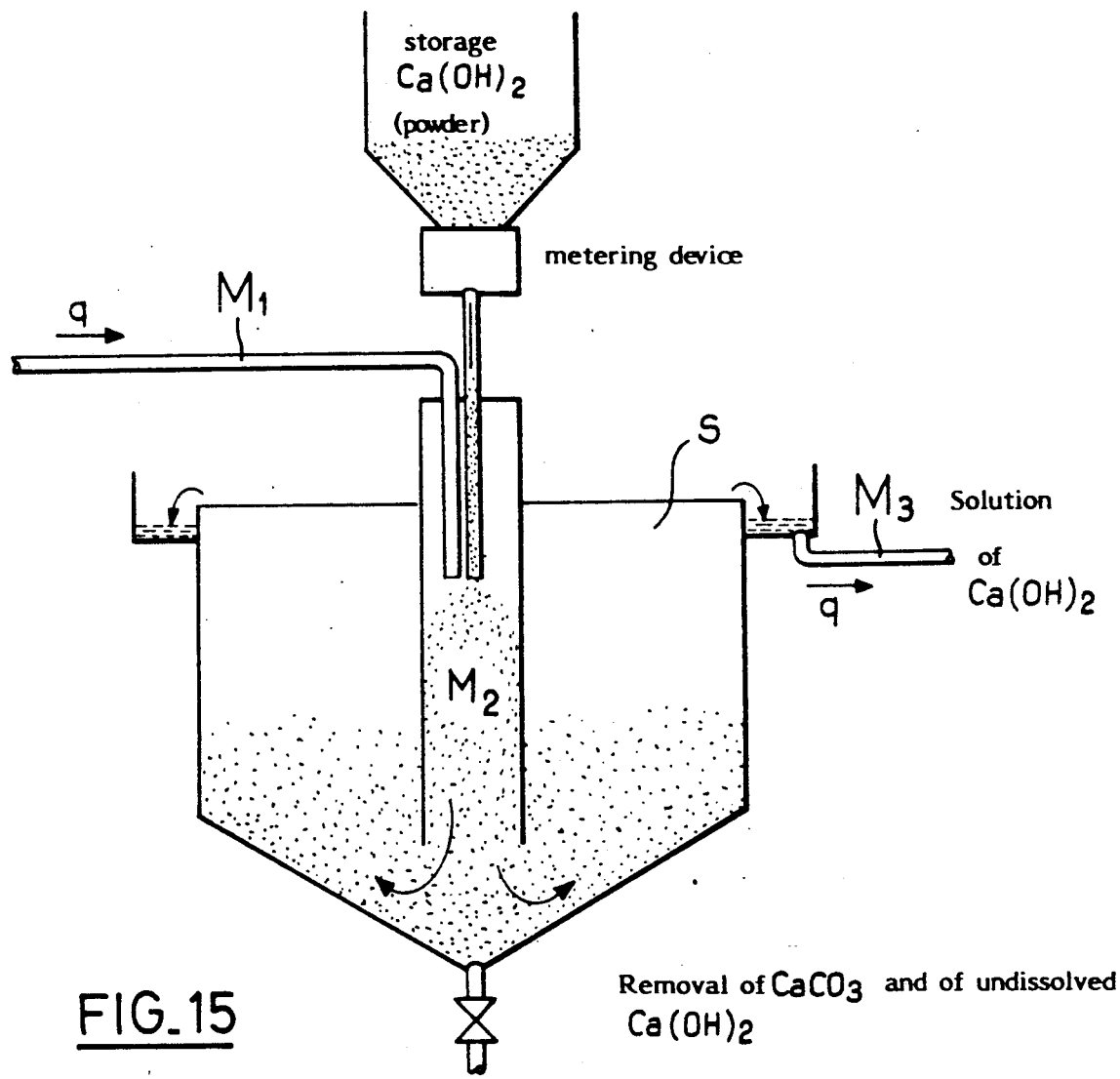
Figure 16:
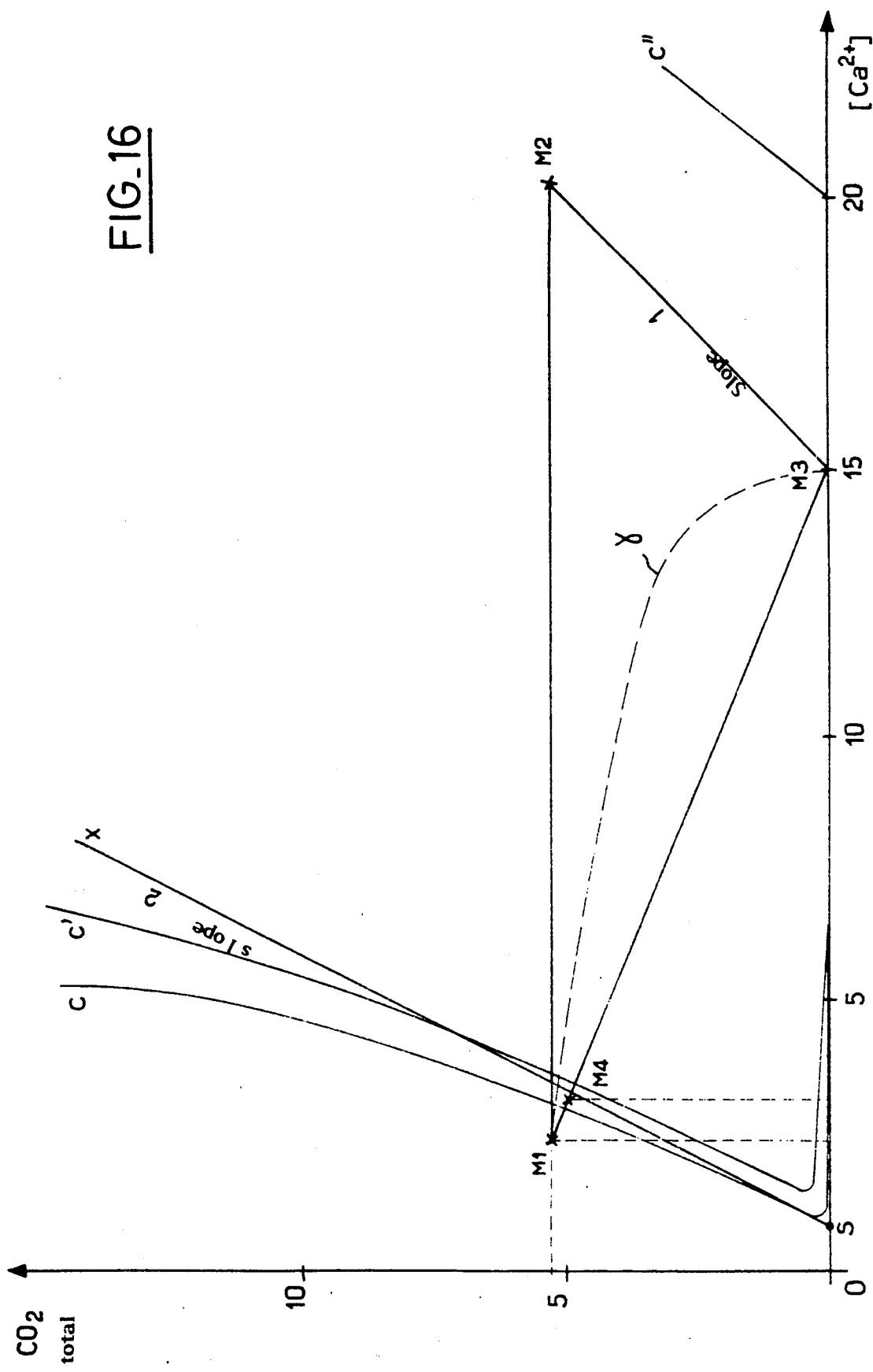
Figure 19:
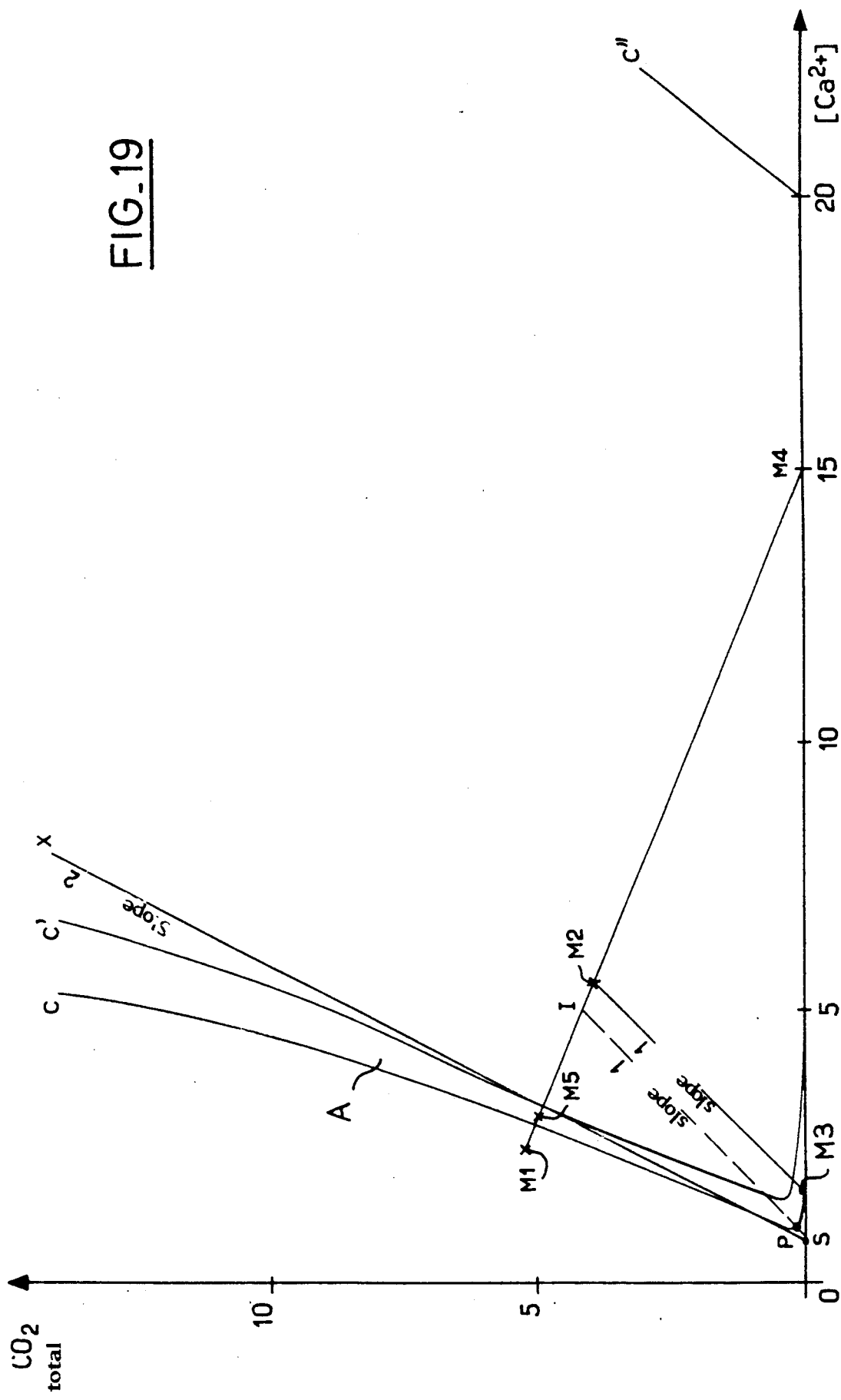

In the appended drawings which are given as non-limiting examples:

FIG. 1 is a diagram in which the concentration of total $CO_2$ is the ordinate and the concentration of $Ca^{2+}$ is the abscissa, which represents curves for the calcium/carbonate equilibrium and the spontaneous precipitation of calcium carbonate, the abscissa of the point S being positive, FIG. 2 is a diagram similar to that of FIG. 1, the abscissa of the point S being negative, FIGS. 3 and 4 are diagrams similar to FIGS. 1 and 2 showing the movement of the point on the graph for the water after addition of $Ca(OH)_2$, FIGS. 5 and 6 are diagrams similar to FIGS. 3 and 4, the addition of $Ca(OH)_2$ being preceded by an addition of $CO_2$, FIGS. 7 and 8 are diagrams showing the addition of sodium hydroxide, FIGS. 9 to 11 are diagrams showing the movement of the point on the graph for the water after addition of lime in different concentrations, FIG. 12 is the schematic diagram of a device enabling solid lime to be added to a water pipework, FIG. 13 is a diagram showing the movement of the point on the graph for the water after addition of lime by means of the device described in FIG. 12, FIG. 14 is the schematic diagram of a known device for addition of solid lime to water, FIG. 15 is a more detailed schematic diagram of the saturator of the device described in FIG. 14, FIG. 16 is a diagram in which the concentration of total $CO_2$ is the ordinate and the concentration of $Ca^{2+}$ is the abscissa, which represents the curves for the calcium/carbonate equilibrium, for the spontaneous precipitation of $CaCo_3$ and of saturation with $Ca(OH)_2$ as well as the movements of the point on the graph for the water after adding lime by means of the device described in FIGS. 14 and 15, FIG. 17 is a schematic diagram of a plant according to the invention, FIG. 18 is a detailed schematic diagram of this plant, FIG. 19 is a diagram similar to that of FIG. 16, showing different points on the graph for water obtained at different points in the plant according to the invention.

Consider a certain volume of water which is aggressive towards solid $CaCO_3$, represented by $M_1$ on the graph total $CO_2$—$Ca^{2+}$ (see FIGS. 9 to 11). In these Figures, the term $\lambda$, the abscissa of the point S, is assumed to be positive and will remain thus during the rest of this description, the description remaining valid if $\lambda$ is negative. Solid particles of $Ca(OH)_2$ are added to this water at different concentrations.

Case 1

The particles of solid $Ca(OH)_2$ are added to the water in a quantity defined by the segment $M_1M_2$, the point $M_2$ still being within the domain of aggressive waters (FIG. 9).

The system develops in the following way:

immediately after the lime is added to the water concerned, the aqueous phase becomes heterogeneous, because its concentration of $Ca^{2+}$ ions, which is very high in the vicinity of each particle, progressively diminishes as the distance from particles increases;

in the vicinity of each particle, the water is therefore unstable. $CaCO_3$ nuclei appear, develop and partially sequester the residual particles of solid $Ca(OH)^2$, whose dissolution is impeded. These nuclei are positively charged as, in their vicinity, the water is supersaturated in $CaCO_3$. The lightest particles can be kept in suspension by electrostatic forces, while the least light particles may be capable of being precipitated;

however, the development continues. On the one hand, the emission of $Ca^{2+}$ ions from particles of solid $Ca(OH)_2$ is not stopped by the precipitates of $CaCo_3$ formed on them. On the other hand, the aqueous phase tends to become homogeneous and solid $CaCO_3$ tends to dissolve in contact with a water which has become locally aggressive again;

when the development is complete, theoretically after an infinite time, it should be observed on the one hand that the particles of solid $Ca(OH)_2$ have completely dissolved, and on the other hand that the water, which has everywhere become aggressive again towards solid $CaCO_3$, has the composition defined by the point $M_2$ and that no precipitate of solid $CaCO_3$ is present anymore.

Case 2

The particles of solid $Ca(OH)_2$ are added to the water in a quantity defined by the segment $M_1 M_2$, the point $M_2$ being in the domain of encrusting waters (FIG. 10).

As previously, after lime is added to the water concerned, $CaCO_3$ precipitates are formed around particles of solid $Ca(OH)_2$ and are capable of partially sequestering them. However, in contrast with the previous case, these precipitates are not capable of being wholly dissolved. When the development is complete after a theoretically infinite time, it should be observed:

the particles of solid $Ca(OH)_2$ have completely dissolved, but that the water, plotted as $M_3$ on the curve C, is in the presence of solid $CaCO_3$.

The development of the water resulting from the addition of solid $Ca(OH)_2$ is shown schematically by a horizontal movement $M_1M_2$ plotting the dissolution of solid $Ca(OH)_2$, and by a movement $M_2M_3$ on a straight line of slope 1, corresponding to the precipitation of $CaCo_3$.

Case 3

The particles of solid $Ca(OH)_2$ are added to the water in a quantity defined by segment $M_1M_2$, the point $M_2$ being in the domain of unstable waters (FIG. 11).

This case greatly resembles the previous case. However when the development is complete, and if the addition of $Ca(OH)_2$ is sufficient, the point $M_3$ on the graph for the water is located on the descending branch of the curve C, which is practically identical with the axis of the abscissae. In other words, the water obtained is decarbonated (the case seen in FIG. 11).

In order to treat the water, it could initially be proposed to add an aqueous suspension of particles of solid $Ca(OH)_2$ directly, upstream of the network, using the device shown schematically in FIG. 12.

The output of water into the pipework 1 would be equal to Q. The output of water into the loop 2 where the lime $Ca(OH)_2$ would be added would be equal to q.

Let us suppose that $M_1$ is the point on the graph for water which is aggressive towards solid $CaCo_3$, which is available (FIG. 13). The particles of solid $Ca(OH)_2$ would be added to this water in a quantity defined by the segment $M_1M_2$, the point $M_2$ being located in the domain of encrusting waters, meaning to the right of the curve of calcium/carbonate equilibrium (curve C) and to the left of the curve of spontaneous precipitation of $CaCO_3$ (curve C').

A treatment process of this kind which was studied in Case 2 above, could enable a water to be obtained whose point on the graph $M_3$ would be located to the right of the ascending branch of the curve of calcium/carbonate equilibrium and perhaps near enough to this curve (FIG. 13). However, there would be numerous disadvantages:

the mixed particles composed of (residual) solid $Ca(OH)_2$ and (precipitated) solid $CaCO_3$ which would be in suspension in the transported water, would carry the risk of giving the distributed water too high a trubidity:

the precipitates of the same composition as the particles in suspension, which would be formed in the vicinity of the lower dimensions of the pipeworks, would carry the risk of excessively reducing the cross section of these works of causing corrosion in their walls, of entraining fermentations and consequently changing the taste of the distributed water;

finally, the transported water could not conform to a well defined composition so that the formation of a protective precipitate would in any case be far from being guaranteed.

However, with the proviso that the coagulant used should not be an aluminum salt, it is possible to add $Ca(PH)_2$ in solid form at the top of a clarifying plant successively comprising flocculation, possible decantation, then filtration. Indeed, the water remains long enough inside a plant of this kind for the solid $Ca(OH)_2$ to be able to dissolve virtually completely. The water coming out of the clarifying plant can thus have the desired concentration of $Ca^{2+}$ ions.

A lime saturator of the current type will now be described, by reference to FIGS. 14 and 15.

Let us suppose that the water which is available is aggressive towards solid $CaCO_3$, without having to be subjected to a clarifying treatment such as that mentioned above. If it is desired to make it encrusting by adding lime, it is necessary to add to it, upstream of the network, not particles of solid $Ca(OH)_2$, but a solution called lime water, having the following characteristics:

absence of carbonic components (free $CO_2$, $HCO_3-$, $CO_3^{2-}$) and consequently a nil value for total $CO_2$;

a content of $Ca^{2+}$ions which is as high as possible, this being limited by the solubility of $Ca(OH)_2$.

A reactant of this type is readily obtained by adding solid $Ca(OH)_2$ to a saturator into which the water bled from the available water is fed, as shown schematically in FIG. 14. The water bled in this way remains in the saturator S for about 1 hour in contact with particles of solid $Ca(OH)_2$ (see FIG. 15). Such a dwell time promotes the dissolution of these particles, which is impeded, it will be recalled, by the $CaCO_3$ precipitates formed round about.

The development of the water in the saturator is similar to that studied in Case 3 above. It is shown in FIG. 16:

the point on the graph for the water at the inlet to the saturator is the point $M_1$, which is also the point on the graph for water which is aggressive towards solid $CaCO_3$, which is available;

the point on the graph for the water at the outlet of the saturator is a point such as $M_3$, located on the branch of the curve of calcium/carbonate equilibrium (curve C), which is practically identical with the axis of the abscissae. The point $M_3$ is to the left of the curve of saturation with $Ca(OH)_2$ (curve C'');

the development of the water inside the saturator is shown schematically by a horizontal movement $M_1M_2$ graphing the dissolution of $Ca(OH)_2$, and by a movement $M_2M_3$ on a straight line of slope 1 corresponding to the precipitation of $CaCO_3$. Indeed, these two movements are simultaneous, so that the point on the graph for the water in the saturator follows a curve such as γ.

The water added to the network is represented by $M_4$, slightly to the right of the curve of calcium/carbonate equilibrium (curve C). The point $M_4$ is the centre of gravity of the point $M_1$ (mass Q−q) and of the point $M_3$ (mass q), where Q and q respectively represent the output added to the network and the output passing through the saturator.

The disadvantages which arise from the use of a lime saturator of the type mentioned above are the following:

To start with, an incomplete dissolution of solid $Ca(OH)_2$ is observed. The precipitates which are extracted from the lime saturator S contain mainly solid $CaCO_3$. However they also contain residual particles of solid $Ca(OH)_2$. Although the water remains inside the saturator S for the order of 1 hour, the dissolution of these particles is far from being complete. The speed of dissolution of solid $Ca(OH)_2$ indeed reduces more and more in proportion as the concentration of $Ca(OH)_2$ dissolved in the water increases and approaches the saturation value. That the degree of dissolution of solid $Ca(OH)_2$ should be much better in the case previously mentioned, where the particles of solid $Ca(OH)_2$ are added at the top of a clarifying plant, is also explained, because the water is then very far from being saturated in $Ca(OH)_2$.

A variable degree of dissolution is also observed.

The presence of residual particles of solid $Ca(OH)_2$ in the precipitates extracted from the lime saturator S would not prevent the treated water from permanently complying with the characteristics defined if the output of water fed into the network were constant. But this output varies in the course of the day. It is thus necessary to vary the output of lime to be added to the water of the network 1 in a parallel manner. To this end, it is advisable to alter the output of the solution passing through the saturator S.

However, the alteration to the output of the solution passing through the saturator S brings about a variation in the time of contact between particles of solid $Ca(OH)_2$ and the liquid phase, and thus a variation of the concentration of $Ca^{2+}$ ions in the solution coming out of the saturator S, this variation working contrary to the desired aim. There is thus no proportionality between the output of lime which has to be added to the water of the network 1 and the output of the solution passing through the saturator S. Consequently, an alteration of the output of the water added to the network 1 leads to a transitory state making it practically impossible to control the content of $Ca^{2+}$ ions in the solution coming out of the saturator S. The result of this is that the composition of the water added to the network 1 cannot comply with the defined characteristics and that the formation of a protective precipitate on the walls of the pipeworks of this network is in danger of being nullified.

Moreover, in the plant previously mentioned, the lime saturator S of the current type has a large volume, resulting from the need for a prolonged contact between the water being fed into the device and the particles of solid $Ca(OH)_2$. This volume is calculated as described in the numerical example below.

In this example it is proposed to show how, starting from the composition of the water which is available as well as the output Q added to the network 1, it is possible to determine the composition of the water added to the network, the output q added to the saturator S, the volume of the saturator and the consumption of lime.

To this end, the method developed in the work "Les equilibres carboniques et l'équilibre calcocarbonique dans les eaux naturelles, Eyrolles 1981", is used.

The composition of the water which is available is the following:

| Cation - anion balance (in milliequivalents per liter) | | | |
|---|---|---|---|
| $[Ca^{2+}] =$ | 4,86 | $[HCO_3^-] =$ | 3,30 |
| $[Mg^{2+}] =$ | 0,34 | $[SO_4^{2-}] =$ | 1,30 |
| $[Na^+] =$ | 0,35 | $[Cl^-] =$ | 0,79 |
| $[K^+] =$ | 0,08 | $[NO_3^-] =$ | 0,24 |
| total = | 5,63 | total = | 5,63 | pH = 6.56
temperature = 16.2° C.
Resulting in:
$[CO_3^{2-}]$: negligible
$[H_2CO_3] = 2,00$
$CO_2$ total $= [H_2CO_3] + [HCO_3^-] + [CO_3^{2-}]$
$CO_2$ total $= 5,30$ FIG. 16, previously mentioned, corresponds exactly to the example above. It will be recalled that the items shown on this FIG. 16 are the following:

$M_1$, the point on the graph for the water which is available and at the same time the point on the graph for the water which is added to the saturator S, C, the curve of the calcium/carbonate equilibrium C', the curve of spontaneous precipitation of $CaCO_3$ C'', the curve of saturation of $Ca(OH)_2$ $M_3$, the point on the graph for the solution at the outlet of the saturator (in order to be specific, the degree of saturation of this solution in $Ca(OH)_2$ was taken to be equal to 75%)

$M_1M_2$, a movement showing schematically the dissolution of solid $Ca(OH)_2$ $M_2M_3$, a movement showing schematically the precipitation of $CaCO_3$ $M_4$, a point on the graph for the water added to the network (this water is the mixture of the solution coming out of the saturator, plotted as $M_3$, and the water which has not passed through the saturator, plotted as $M_1$).

The composition (plotted as $M_4$) of the water added to the network 1 is the following:

| Cation - anion balance (in milliequivalents per liter) | | | |
|---|---|---|---|
| $[Ca^{2+}] =$ | 6,24 | $[HCO_3^-] =$ | 4,67 |
| $[Mg^{2+}] =$ | 0,34 | $[SO_4^{2-}] =$ | 1,30 |
| $[Na^+] =$ | 0,35 | $[Cl^-] =$ | 0,79 |
| $[K^+] =$ | 0,08 | $[NO_3^-] =$ | 0,24 |
| total = | 7,01 | total = | 7,00 | pH = 7.47
temperature = 16.2° C.
Resulting in:
$[CO_3^{2-}]$ : negligible
$[H_2CO_3] = 0,34$
$CO_2$ total $= 5,01$ Indeed, the composition of the water added to the network 1 varies according to the degree saturation in $Ca(OH)_2$ of the solution coming out of the saturator. This degree is itself variable as has been indicated above.

The output q which is added to the saturator S is calculated as follows:

Let us suppose that Q is the output added to the network 1 and q is the output added to the saturator S.

The point $M_4$ is the centre of gravity of the point $M_1$ (mass $Q-q$) and of the point $M_3$ (mass $q$):

$$(Q-q) M_4M_1 = q\, M_4M_3$$

Resulting, in the example considered, in:

$$q = 0.055\, Q$$

Let us suppose that there is a daily consumption of 10,000 $m^3$ of water.
The result of this is:

$$q = 550\ m^3 \text{ per day.}$$

It is now possible to determine the volume (V) which the saturator S must have so that the duration of the contact between the liquid phase and the particles of solid $Ca(OH)_2$ may be 1 hour:

$$V = 550/24\ m^3$$

$$V = 23\ m^3$$

To a first approximation, the consumption of lime is the sum:
of the calcium added to the water which was added to the network as a result of the treatment:

$$Q\ ([Ca^{2+}]M_4 - [Ca^{2+}]M_1)$$

which is
10,000 $m^3$/day $\times$ (3.12—2.43) moles/$m^3$
6,900 moles/day
510 kg/day of $Ca(OH)_2$
and of the calcium precipitated in the form of $CaCo_3$ in the saturator:

$$q \times CO_2 \text{ total } M_1$$

which is:
550 $m^3$/day $\times$ 5.30 moles/$m^3$
2,915 moles/day
216 kg/day of $Ca(OH)_2$ The calculated daily consumption of lime is thus 0.73 tonne. However, the actual consumption is greater, taking account of the residual particles of solid $Ca(OH)_2$ which are not dissolved.

The plant for using the process according to the invention will now be described, by reference to FIGS. 17 and 18.

This plant mainly comprises a storage tank R for powdered lime, a loop 2 for bleeding water from a pipework 1 and a lime saturator S located on this loop 2.

A screw metering device 3 is located horizontally below the tank R, tipping powdered lime into a funnel 4 which communicates with a pipe 5 connected to the outlet of a decarbonator D and to the inlet of the saturator S.

The loop 2 comprises, upstream of the saturator S, relative to the flow direction of the water, a decarbonator D fed with water which is to be treated. The pipe 6 which connects the outlet of the saturator S with the pipework 1 comprises a loop 7 for recycling a part of the solution coming out of the saturator S into the decarbonator D.

The pipe 2 for bleeding water from the pipework and the recycling loop 7 coming out of the saturator S discharge into the decarbonator D in its lower part, by means of a diffuser 8.

The lower part of the decarbonator D comprises a connection piece 9 for removing precipitated $CaCO_3$.

Further, the recycling loop 7 coming out of the saturator S comprises a pump 10 and an output control valve 11.

Moreover, the saturator S is provided with a stirrer 12 and baffle plates 13.

The working of the plant and the use of the process according to the invention will now be described.

The water added to the plant is initially mixed in a decarbonator D with a solution coming out of the saturator S. This solution, which is lean in carbonic components, has a constant $Ca(OH)_2$ content, for example 75% of the concentration corresponding to saturation. It is represented on FIG. 19 by a point such as $M_4$, located to the left of the curve of saturation with $Ca(OH)_2$ (curve C″) and being on the branch of the curve of calcium/carbonate equilibrium (curve C), which is practically identical with the axis of the abscissae.

The development of the point on the graph for the water in the decarbonator (D) is the following:
before being mixed with the solution coming out of the saturator S, the water is represented by the point $M_1$, which is also the point on the graph for the available water which is aggressive towards solid $CaCO_3$;
the point on the graph for the water originating from the mixture is the centre of gravity $M_2$ of the point $M_1$ (mass q) and of the point $M_4$ (mass r), where q and r respectively represent the output added to the plant and the recycled output coming out of the saturator S;
by virtue of the spontaneous precipitation of $CaCO_3$, the point on the graph for the water inside the decarbonator D moves from $M_2$ to $M_3$, at the intersection of the semi straight line of slope 1, originating at $M_2$, and of the branch of the curve of calcium/carbonate equilibrium C, which is practically identical with the axis of the abscissae.

The water coming out of the decarbonator D is mixed with solid $Ca(OH)_2$ upstream of the saturator S. No precipitate of $CaCO_3$ can form inside the saturator. The dissolution of the solid phase, which is accelerated due to a stirrer, leads very rapidly to the formation of a solution having a definite concentration of $Ca(OH)_2$. The point on the graph for the water moves from $M_3$ to $M_4$.

The water added to the pipework 1 of the network downstream of the treatment is represented by $M_5$, slightly to the right of the curve of calcium/carbonate equilibrium (curve C). The point $M_5$ is the centre of gravity of the point $M_1$ (mass $Q-q$) and of the point $M_4$ (mass q), where Q and q respectively represent the output added to the pipework 1 of the network and the output passing through the plant.

The recycled output r must conform with the two conditions below:
be high enough so that the water coming out of the decarbonator D is almost completely decarbonated, and thus represented on the branch of the curve of calcium/carbonate equilibrium (curve C), which is practically identical with the axis of the abscissae. To this end, the point $M_2$ must be located to the right of the point I which is common to the straight line $M_1M_4$ and to the semi-straight line of slope 1, originating at the point S of the abscissa $\lambda$ if $\lambda$ is positive or originating from the point 0, the origin of the coordinate axes, if $\lambda$ is negative;

not be too high in order to minimize the expenditure of energy. To this end, the point $M_2$ must not be too far from the point I.

When starting up the plant, it may be advantageous if required to add solid $Ca(OH)_2$ to the decarbonator D so that the water coming out of this latter may be immediately decarbonated.

The advantages of the plant according to the invention are the following:

This plant enables solid $Ca(OH)_2$ to be completely dissolved. The precipitates which are extracted from the decarbonator D only contain calcium carbonate. The lime used is indeed completely dissolved in the saturator S. The yield of the plant is thus better than that of the current lime saturator. The only lime fraction which is lost corresponds to the precipitated calcium carbonate. Such a loss is inevitable.

However, the main advantage of the plant is that the solution which comes out of it can conform to a definite composition despite daily variations in the output of the water added to the network. Indeed, it is sufficient to vary the output q passing through the plant proportionately. The result is that the water added to the network can also conform to a definite composition and that the formation of a protective precipitate of solid $CaCO_3$ on the internal walls of pipeworks is possible.

Further, the plant has a smaller volume. Indeed, the volume of the decarbonator D and that of the saturator S are much smaller in conjunction than the volume of the saturator of the current type. The residence time of the water is only of the order of 10 minutes in each compartment of the novel plant, while it is of the order of 1 hour in the current device. The storage capacity is thus reduced by about two thirds.

Numerical application

In the same example as that previously proposed in the study of the lime saturator of the current type, it is shown below how, with the plant according to the invention, the composition of the water added to the network, the output added to plant, the volume of each of its two compartments, the recycled output and the consumption of lime can be determined.

Let us thus suppose that the water which is available has the same composition as that shown in the previous example.

FIG. 19, previously mentioned, corresponds precisely to the example selected. It will be recalled that the items entered in this figure are the following:

$M_1$, the point on the graph for the water which is available and simultaneously the point on the graph for the water added to the plant C, the curve of calcium/carbonate equilibrium C', the curve of spontaneous precipitation of $CaCO_3$ C'', the curve of saturation with $Ca(OH)_2$ $M_4$, the point on the graph for the solution at the outlet for the saturator (to be specific, the degree of saturation of this solution with $Ca(OH)_2$ was taken as being equal to 75%).

$M_2$, the point on the graph for the water originating from the mixture, produced in the decarbonator, of the water added to the plant and the solution coming out of the saturator $M_2M_3$, the movement schematically representing the precipitation of $CaCO_3$ $M_5$, the point on the graph for the water added to the network (this water is the mixture of the solution coming out of the saturator, plotted as $M_4$, and the water which has not passed through the plant, plotted as $M_1$.

The composition of the water added to the network (plotted as $M_5$) is the same as that calculated previously, which corresponds to the case of the lime saturator of the current type. However in the case of the plant according to the invention, and in contrast with the case of the current saturator, this composition is stable.

As previously, the output added to the network is designated as Q and the output added to the plant is designated as q.

The point $M_5$ is the centre of gravity of the point $M_1$ (mass $Q-q$) and of the point $M_4$ (mass q):

$$(Q-q)M_5M_1 = q\, M_5M_4$$

Resulting, in the example considered in:

$$q = 0.055\, Q$$

The daily consumption being 10,000 m³ of water, the result is:

$$q = 550\ m^3 \text{ per day}$$

The residence time of the water is of the order of 10 minutes in the decarbonator D, as in the saturator S.

The result is a volume of about 4 m³ for each of the two compartments of the plant.

The recycled output r must be slightly greater than the value at which the water coming out of the decarbonator would be plotted at the peak P of the curve of calcium/ carbonate equilibrium (curve C).

In order to determine this minimal output, it will be stated that the water resulting from the mixture of the water added to the plant, plotted as $M_1$, and the solution coming out of the saturator S, plotted as $M_4$, is represented as I, on the straight line of slope 1 originating from the point S:

$$q \times 1M_1 = r \times 1M_4$$

The result is:

$$r = 85\ m^3 \text{ per day.}$$

The calculation carried out by the method shown above leads to the same daily consumption of lime as in the case of the saturator of the current type, namely 0.73 tonne. However in the case of the plant according to the invention, the calculated consumption corresponds much more to the actual consumption since the particles of solid $Ca(OH)_2$ added to the plant are completely dissolved.

We claim:

1. Plant for treating water from a first pipe to protect the internal walls of a pipework, comprising a storage tank (R) for powdered lime, a loop (2) for bleeding water from said first pipe (1), a lime saturator (S( located on the loop (2), means (3, 4, 5) for adding powdered lime from the storage tank (R) into the saturator (S), wherein the loop (2) comprises, upstream of the saturator (S), relative to the direction of water flow, a decarbonator (D) fed with water which is to be treated, and wherein a second pipe (6, 2) which connects the outlet of the saturator (S) with said first pipe (1) comprises a loop (7) for recycling a part of the material from the saturator (S) to the decarbonator (D), and said means for adding powdered lime includes a pipe (5) which receives said powdered lime and which connects the outlet of the decarbonator (D) with the inlet of the saturator (S).

2. Plant according to claim 1, wherein the loop (2) for bleeding the water from the first pipe (1) and the recycling loop (7) from the saturator (S) discharge into the decarbonator (D) in its lower part, by means of a diffuser (8).

3. Plant according to claim 2, wherein the lower part of the decarbonator (D) comprises a branch line (9) for removing precipitated $CaCO_3$.

4. Plant according to claim 1, wherein the recycling loop (7) from the saturator (S) comprises a pump (10) and an output control valve (11).

5. Plant according to claim 1, wherein the saturator (S) comprises a stirrer (12).

6. In a method for protecting the internal walls of a water pipework from corrosion, comprising continuously bleeding water from a pipe (1), feeding the bled water into a saturator (S), adding powdered lime to the saturator, feeding the bled water from the saturator back into the pipe (1), the quantity of lime added to the saturator being sufficient to form a precipitate of calcium carbonate adhering to said internal walls of said pipework thereby to protect said internal walls against corrosion; the improvement wherein, before adding said bled water to the saturator (S), mixing said bled water in a decarbonator (D) with a solution which is devoid of $CO_2$ and is loaded with lime originating from the saturator, and causing material from the saturator to flow to the decarbonator at a flow rate high enough to effect the substantially complete elimination of $CO_2$ in the decarbonator by precipitation of $CaCo_3$.

* * * * *